United States Patent
Alanen et al.

(10) Patent No.: US 12,207,297 B2
(45) Date of Patent: Jan. 21, 2025

(54) COEXISTENCE OF DEVICES IN WIRELESS NETWORK

(71) Applicant: Nokia Technologies Oy, Espoo (FI)

(72) Inventors: Olli Alanen, Vantaa (FI); David Lopez-Perez, Blanchardstown (IE); Mika Kasslin, Espoo (FI); Adrian Garcia Rodriguez, Santa Cruz de Tenerife (ES); Lorenzo Galati Giordano, Stuttgart (DE)

(73) Assignee: Nokia Technologies Oy, Espoo (FI)

( * ) Notice: Subject to any disclaimer, the term of this patent is extended or adjusted under 35 U.S.C. 154(b) by 349 days.

(21) Appl. No.: 17/798,995

(22) PCT Filed: Dec. 22, 2020

(86) PCT No.: PCT/EP2020/087554
§ 371 (c)(1),
(2) Date: Aug. 11, 2022

(87) PCT Pub. No.: WO2021/160332
PCT Pub. Date: Aug. 19, 2021

(65) Prior Publication Data
US 2023/0345526 A1     Oct. 26, 2023

Related U.S. Application Data

(60) Provisional application No. 62/976,144, filed on Feb. 13, 2020.

(51) Int. Cl.
*H04W 74/08*     (2024.01)
*H04W 72/12*     (2023.01)
*H04W 88/06*     (2009.01)

(52) U.S. Cl.
CPC ....... *H04W 74/08* (2013.01); *H04W 72/1215* (2013.01); *H04W 88/06* (2013.01)

(58) Field of Classification Search
CPC . H04W 16/10; H04W 72/1215; H04W 74/08; H04W 84/12; H04W 88/06
(Continued)

(56) References Cited

U.S. PATENT DOCUMENTS 11,601,973 B2 * 3/2023 Jang ..................... H04L 5/0055
2016/0338106 A1 * 11/2016 Liu .................. H04W 74/0816
(Continued)

FOREIGN PATENT DOCUMENTS

EP     2999252 A1     3/2016
EP     3163964 A1     5/2017

OTHER PUBLICATIONS

"IEEE 802.11be", Wikipedia, Retrieved on Aug. 23, 2022, Webpage available at : https://en.wikipedia.org/wiki/IEEE_802.11be, 4 pages.
(Continued)

*Primary Examiner* — Robert J Lopata
(74) *Attorney, Agent, or Firm* — Nokia Technologies Oy

(57) ABSTRACT

Method for channel contention and data frame transmission in a wireless network. Said method for an apparatus of a first wireless network comprises: operating the apparatus on at least a first channel and a second channel of the first wireless network; while performing said operating in a first operating mode to transmit a first data frame to a receiver apparatus of the first wireless network, contending (202) simultaneously on both the first channel and the second channel and transmitting (206, 208) the first data frame on the one of the first channel and second channel where said contending is first successful; switching from the first operating mode to a second operating mode; while operating in the second operating mode to transmit a second data frame to the receiver apparatus, contending (212) simultaneously on both the first channel and the second channel and transmitting (216, 218, 220) the second data frame to the receiver
(Continued)

apparatus according to the following conditions: in response to successful contention on the first channel before successful contention on the second channel, transmitting the second data frame to the receiver apparatus on the first channel; and in response to successful contention on the second channel before successful contention on the first channel, transmitting the second data frame on the second channel if the contention becomes successful also on the first channel or if the first channel is reserved to an apparatus of a second wireless network different from the first wireless network while the second data frame is transmitted.

20 Claims, 3 Drawing Sheets

(58) Field of Classification Search
USPC .......................................................... 370/329
See application file for complete search history.

(56) References Cited

U.S. PATENT DOCUMENTS

2017/0142592 A1* 5/2017 Fischer ................ H04W 16/14

2018/0213569 A1* 7/2018 Guan .................... H04L 5/0057
2018/0279371 A1* 9/2018 Li ........................ H04W 88/08
2021/0212118 A1* 7/2021 Lu ..................... H04W 74/0816

OTHER PUBLICATIONS

"IEEE 802.11", Wikipedia, Retrieved on Aug. 23, 2022, Webpage available at : https://en.wikipedia.org/wiki/IEEE_802.11, 15 pages.
International Search Report and Written Opinion received for corresponding Patent Cooperation Treaty Application No. PCT/EP2020/087554, dated Apr. 15, 2021, 14 pages.
Han et al., "Capacity Analysis of Opportunistic Channel Bonding Over Multi-Channel WLANs Under Unsaturated Traffic", IEEE Transactions on Communications, vol. 68, No. 3, Mar. 2020, pp. 1552-1566.
Falconetti et al., "Design and Evaluation of Licensed Assisted Access LTE in Unlicensed Spectrum", IEEE Wireless Communications, vol. 23, No. 6, Dec. 2016, pp. 24-30.
Li et al., "Multi-Carrier LAA with Adaptive Energy Detection and Carrier Selection", IEEE 90th Vehicular Technology Conference (VTC2019-Fall), Sep. 22-25, 2019, 5 pages.
"P802.19.3(TM)/D0.02 Draft Recommended Practice for Local and Metropolitan Area Networks—Part 19: Coexistence Methods for 802.11 and 802.15.4 based systems operating in the Sub-1 GHz Frequency Bands", IEEE Computer Society, vol. 802.19, No. D02 Jan. 2020, 63 pages.

* cited by examiner

COEXISTENCE OF DEVICES IN WIRELESS NETWORK

RELATED APPLICATION

This application claims priority to PCT Application No. PCT/EP2020/087554, filed on Dec. 22, 2020, which claims priority to U.S. Provisional Application No. 62/976,144, filed on Feb. 13, 2020, each of which is incorporated herein by reference in its entirety.

FIELD

Various embodiments described herein relate to the field of wireless communications and, particularly, to improving coexistence of devices with different capabilities in a wireless network.

BACKGROUND

With the development of wireless networks, devices with new features and capabilities emerge. This leads to coexistence of such devices with "legacy" devices that do not support such new features or support them in a different manner. The development of the new capabilities may also require development of coexistence mechanisms that enable maintenance of the performance of the legacy devices is maintained, or at least enable operation of the legacy devices.

BRIEF DESCRIPTION

Some aspects of the invention are defined by the independent claims.

Some embodiments of the invention are defined in the dependent claims.

The embodiments and features, if any, described in this specification that do not fall under the scope of the independent claims are to be interpreted as examples useful for understanding various embodiments of the invention. Some aspects of the disclosure are defined by the independent claims.

According to an aspect, there is provided an apparatus for a first wireless network, comprising means for performing: operating, on at least a first channel and a second channel of the first wireless network; while performing said operating in a first operating mode to transmit a first data frame to a receiver apparatus of the first wireless network, contending simultaneously on both the first channel and the second channel and transmitting the first data frame on the one of the first channel and second channel where said contending is first successful; switching from the first operating mode to a second operating mode; while operating in the second operating mode to transmit a second data frame to the receiver apparatus, contending simultaneously on both the first channel and the second channel and transmitting the second data frame to the receiver apparatus according to the following conditions: in response to successful contention on the first channel before successful contention on the second channel, transmitting the second data frame to the receiver apparatus on the first channel; and in response to successful contention on the second channel before successful contention on the first channel, transmitting the second data frame on the second channel if the contention becomes successful also on the first channel or if the first channel is reserved to an apparatus of a second wireless network different from the first wireless network while the second data frame is transmitted.

In an embodiment, the means are configured to send, in the second operating mode, a frame on the first channel while transmitting the second frame on the second channel in a case where the contention is successful on the second channel before the first channel and the channel contention is successful also on the first channel.

In an embodiment, the means are configured to prevent or postpone the transmission of the second data frame on the second channel in the second operating mode, if the contention is successful on the second channel before the first channel and while the first channel is detected as reserved by another apparatus of the first wireless network.

In an embodiment, the means are configured in the second operating mode to postpone, if the contention is first successful on the second channel and if the first channel is detected as reserved by said another apparatus of the first wireless network, the transmission of the second data frame on the second channel until the contention is successful also on the first channel.

In an embodiment, the means are configured in the second operating mode to transmit the second data frame, in response to said successful contention on the second channel before the first channel and in response to said detecting that the first channel is reserved to said apparatus of the second wireless network for a reservation period, such that the transmission of the second data frame starts and ends during the reservation period.

In an embodiment, the reservation period is based on a network allocation vector according to IEEE 802.11 specifications.

In an embodiment, the means are configured to transmit, while operating in the second operating mode and in response to successful channel contention on both the first channel and the second channel, the second data frame on the first channel.

In an embodiment, the first channel is a primary channel of a basic service set, and the receiver apparatus is an access node of the first wireless network.

In an embodiment, the means are configured to switch from the first operating mode to the second operating mode in response to a message received from the receiver apparatus, the message indicating said switch to the second operating mode.

In an embodiment, the means are configured to switch from the second operating mode to the first operating mode in response to receiving, from the receiver apparatus, a message indicating to switch to the first operating mode.

In an embodiment, the message is a beacon frame or an action frame.

In an embodiment, the means are configured to transmit, in response to successful contention on the second channel simultaneously with successful contention on the first channel, the second data frame on the second channel and a frame on the first channel.

In an embodiment, the means are configured to perform the channel contention on the first channel and the second channel by using a physical carrier sensing function to determine whether the first channel and the second channel, respectively, is busy or idle.

In an embodiment, the means are configured to prevent transmitting any frame on the first channel while transmitting the second data frame on the second channel.

In an embodiment, the means comprises: at least one processor; and at least one memory including computer program code, the at least one memory and computer program code configured to, with the at least one processor, cause the performance of the apparatus.

According to an aspect, there is provided a method for an apparatus of a first wireless network, comprising: operating, by the apparatus on at least a first channel and a second channel of the first wireless network; while performing said operating in a first operating mode to transmit a first data frame to a receiver apparatus of the first wireless network, contending by the apparatus simultaneously on both the first channel and the second channel and transmitting the first data frame on the one of the first channel and second channel where said contending is first successful; switching, by the apparatus, from the first operating mode to a second operating mode; while operating, by the apparatus, in the second operating mode to transmit a second data frame to the receiver apparatus, contending simultaneously on both the first channel and the second channel and transmitting the second data frame to the receiver apparatus according to the following conditions: in response to successful contention on the first channel before successful contention on the second channel, transmitting the second data frame to the receiver apparatus on the first channel; and in response to successful contention on the second channel before successful contention on the first channel, transmitting the second data frame on the second channel if the contention becomes successful also on the first channel or if the first channel is reserved to an apparatus of a second wireless network different from the first wireless network while the second data frame is transmitted.

In an embodiment, the apparatus transmits, in the second operating mode, a frame on the first channel while transmitting the second frame on the second channel in a case where the contention is successful on the second channel before the first channel and the channel contention is successful also on the first channel.

In an embodiment, the apparatus prevents or postpones the transmission of the second data frame on the second channel in the second operating mode, if the contention is successful on the second channel before the first channel and while the first channel is detected as reserved by another apparatus of the first wireless network.

In an embodiment, the apparatus in the second operating mode postpones, if the contention is first successful on the second channel and if the first channel is detected as reserved by said another apparatus of the first wireless network, the transmission of the second data frame on the second channel until the contention is successful also on the first channel.

In an embodiment, the apparatus in the second operating mode transmits the second data frame, in response to said successful contention on the second channel before the first channel and in response to said detecting that the first channel is reserved to said apparatus of the second wireless network for a reservation period, such that the transmission of the second data frame starts and ends during the reservation period.

In an embodiment, the reservation period is based on a network allocation vector according to IEEE 802.11 specifications.

In an embodiment, the apparatus transmits, while operating in the second operating mode and in response to successful channel contention on both the first channel and the second channel, the second data frame on the first channel.

In an embodiment, the first channel is a primary channel of a basic service set, and the receiver apparatus is an access node of the first wireless network.

In an embodiment, the apparatus switches from the first operating mode to the second operating mode in response to a message received from the receiver apparatus, the message indicating said switch to the second operating mode.

In an embodiment, the apparatus switches from the second operating mode to the first operating mode in response to receiving, from the receiver apparatus, a message indicating to switch to the first operating mode.

In an embodiment, the message is a beacon frame or an action frame.

In an embodiment, the apparatus transmits, in response to successful contention on the second channel simultaneously with successful contention on the first channel, the second data frame on the second channel and a frame on the first channel.

In an embodiment, the apparatus performs the channel contention on the first channel and the second channel by using a physical carrier sensing function to determine whether the first channel and the second channel, respectively, is busy or idle.

In an embodiment, the apparatus prevents transmitting any frame on the first channel while transmitting the second data frame on the second channel.

According to an aspect, there is provided a computer program product embodied on a computer-readable medium and comprising a computer program code readable by a computer for an apparatus of a first wireless network, wherein the computer program code configures the computer to carry out a computer process comprising: operating the apparatus on at least a first channel and a second channel of the first wireless network; while performing said operating in a first operating mode to transmit a first data frame to a receiver apparatus of the first wireless network, contending simultaneously on both the first channel and the second channel and transmitting the first data frame on the one of the first channel and second channel where said contending is first successful; switching from the first operating mode to a second operating mode; while operating in the second operating mode to transmit a second data frame to the receiver apparatus, contending simultaneously on both the first channel and the second channel and transmitting the second data frame to the receiver apparatus according to the following conditions: in response to successful contention on the first channel before successful contention on the second channel, transmitting the second data frame to the receiver apparatus on the first channel; and in response to successful contention on the second channel before successful contention on the first channel, transmitting the second data frame on the second channel if the contention becomes successful also on the first channel or if the first channel is reserved to an apparatus of a second wireless network different from the first wireless network while the second data frame is transmitted.

In an embodiment, the computer program code configures the computer to carry out all the steps of any one of the embodiments of the method.

LIST OF DRAWINGS

Embodiments are described below, by way of example only, with reference to the accompanying drawings, in which FIG. 1 illustrates a wireless communication scenario to which some embodiments of the invention may be applied;

DESCRIPTION OF EMBODIMENTS

The following embodiments are examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Figure 1:
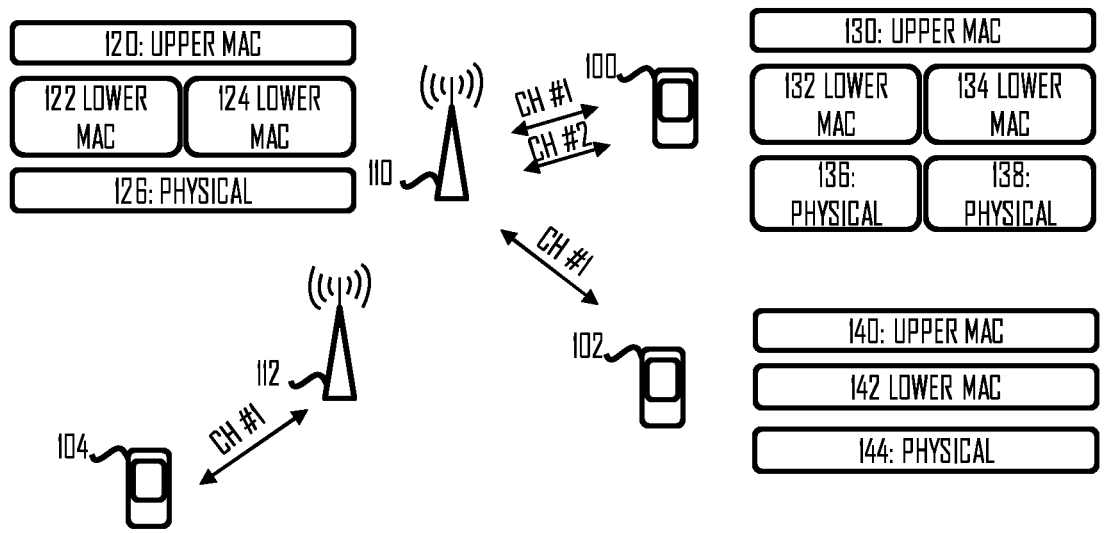

A general wireless communication scenario to which embodiments of the invention may be applied is illustrated in FIG. 1. FIG. 1 illustrates wireless communication devices comprising a plurality of access points (AP) 110, 112 and a plurality of wireless terminal devices or stations (STA) 100, 102, 104. Each AP may be associated with a basic service set (BSS) which is a basic building block of an IEEE 802.11 wireless local area network (WLAN). The most common BSS type is an infrastructure BSS that includes a single AP together with all STAs associated with the AP. The AP may be a fixed AP or it may be a mobile AP, and a general term for an apparatus managing a wireless network such as the BSS and providing the stations with wireless services is an access node. The APs 110, 112 may also provide access to other networks, e.g. the Internet. In another embodiment, the BSS may comprise a plurality of APs to form an extended service set (ESS), e.g. the AP 110 or 112 may belong to the same ESS with another AP and have the same service set identifier (SSID). However, in some embodiments described below, the APs 110, 112 are considered to provide different wireless networks (different BSSs), overlapping BSSs (OBSS) operating at least partially on the same channels. While embodiments of the invention are described in the context of the above-described topologies of IEEE 802.11 based networks, it should be appreciated that these or other embodiments of the invention may be applicable to networks based on other specifications, e.g. different versions of the IEEE 802.11, WiMAX (Worldwide Interoperability for Microwave Access), UMTS LTE (Long-term Evolution for Universal Mobile Telecommunication System), and other networks having cognitive radio features, e.g. transmission medium sensing features and adaptiveness to coexist with radio access networks based on different specifications and/or standards.

IEEE 802.11n specification specifies a data transmission mode that includes 20 megahertz (MHz) wide primary and secondary channels. The primary channel is used in all data transmissions with clients supporting only the 20 MHz mode and with clients supporting higher bandwidths. A further definition in 802.11n is that the primary and secondary channels are adjacent. The 802.11n specification also defines a mode in which a STA may, in addition to the primary channel, occupy one secondary channel which results in a maximum bandwidth of 40 MHz. IEEE 802.11ac amendment extends such an operation model to provide for wider bandwidths by increasing the number of secondary channels from 1 up to 7, thus resulting in bandwidths of 20 MHz, 40 MHz, 80 MHz, and 160 MHz. A 40 MHz transmission band may be formed by two contiguous 20 MHz bands, and an 80 MHz transmission band may be formed by two contiguous 40 MHz bands. However, a 160 MHz band may be formed by two contiguous or non-contiguous 80 MHz bands. These principles apply to other 802.11 specifications as well, e.g. 802.11ax.

Some IEEE 802.11 networks employ channel contention based on carrier sense multiple access with collision avoidance (CSMA/CA) for channel access. The CSMA/CA is an example of a physical carrier sensing function to determine whether the first channel and the second channel, respectively, is busy or idle. Every device attempting to gain a transmission opportunity (TXOP) is reducing a backoff value while the primary channel is sensed to be idle for a certain time interval. The backoff value may be selected randomly within a range defined by a contention window parameter. The contention window may have different ranges for different types of traffic, thus affecting priority of the different types of traffic. The channel sensing may be based on sensing a level of radio energy in the radio channel. The sensed level may be compared with a threshold: if the sensed level is below the threshold level, the channel may be determined to be idle (otherwise busy). Such a procedure is called clear channel assessment (CCA) in 802.11 specifications. When the backoff value reaches zero, the device gains the TXOP and starts frame transmission. If another device gains the TXOP before that, the backoff value computation may be suspended, and the device continues the backoff computation after the TXOP of the other device has ended and the primary channel is sensed to be idle. The time duration (the backoff value) may not be decremented during the TXOP of the other device, but the time duration that already lapsed before the suspension may be maintained, which means that the device now has a higher probability of gaining the TXOP. Once the device wins the channel contention and gains access to the channel, it may transmit a frame that defines a reservation period for the channel access. The reservation period may be defined by a duration field in the frame. Upon detecting the reservation period from the frame, any other device contending on the same channel may set a network allocation vector (NAV) for the duration of the reservation period and refrain the contention on the channel for the duration of the reservation period. The use of NAV for determining that the channel is busy is called virtual carrier sensing in some literature.

Other wireless networks may employ similar channel contention procedures. For example, the LTE systems employ a listen-before-talk (LBT) protocol based on sensing the channel before the channel access.

The STA 100, 102, 104 may be considered to be a terminal device or a station capable of connecting or associating to any one of the APs 110, 112. The STA may establish a connection with any one of APs it has detected to provide a wireless connection within the neighbourhood of the STA. The connection establishment may include authentication in which an identity of the STA is established in the AP. The authentication may comprise setting up an encryption key used in the BSS. After the authentication, the AP and the STA may carry out association in which the STA is fully registered in the BSS, e.g. by providing the STA with an association identifier (AID). A separate user authentication may follow association, which may also comprise building an encryption key used in the BSS. It should be noted that in other systems terms authentication and association are not necessarily used and, therefore, the association of the STA to an AP should be understood broadly as establishing a connection between the STA and the AP such that the STA is in a connected state with respect to the AP and waiting for downlink frame transmissions from the AP and monitoring its own buffers for uplink frame transmissions. A STA not associated to the AP is in an unassociated state. An unassociated STA may still exchange some frames with the AP, e.g. discovery frames.

As described in Background, the development of the wireless networks may lead to situations where the APs 110, 112 and the STAs 100 to 104 have various features and capabilities. Let us describe some of such capabilities with reference to the protocol layers illustrated in FIG. 1. With the development of the 802.11 networks, a multi-link feature has been introduced. For example, there has been discussions in IEEE 802.11be task group related to developing a capability of accessing multiple channels concurrently and independently of one another. Before discussing that aspect more, let us describe the protocol layer of STA 102 that represents a legacy device. In some legacy device, a single protocol stack is supported where there is a single protocol entity on a physical layer 144 and on upper and lower medium access control (MAC) layers 140, 142. The physical layer 144 may handle radio frequency and baseband signal processing tasks in the transmission and reception. The lower MAC layer 142 may be responsible for channel contention, including the NAV, CCA etc. The upper MAC layer 140 may be responsible of the association and authentication procedures, for example. In other legacy devices, multiple MAC layers and multiple physical layers may be provided but the number of MAC layers is equal to the number of physical layers. The legacy devices may support operation multiple channels with the condition that the channel contention is performed only on the primary channel Upon successful channel contention on the primary channel, the device may transmit a frame on the primary channel and, further, on one or more secondary channels. The CCA procedure may be executed on the secondary channel(s) to ensure that they are also free for transmission. The split of the MAC layer into lower and upper MAC layer may be logical and/or physical. For example, a different physical entity may execute functions of the lower MAC layer than a physical entity executing functions of the upper MAC layer.

In general, the term 'legacy device' may follow the definition conventionally used in the field. A legacy device may refer to an outdated or earlier version of a communication protocol that is still operational in the wireless networks, together with modern devices supporting later or latest version(s) of the communication protocol.

The embodiments described below relate to a wireless device for the multi-link-capable STA having multiple parallel lower protocol layers, e.g. the STA 100. As illustrated in FIG. 1, the STA 100 may support a single upper MAC layer 130 and multiple lower MAC layers 132, 134, and a physical layer 136, 138 per lower MAC layer 132, 134. The multiple lower protocol layers (per upper MAC layer) enable the STA to contend, within the same association, simultaneously on multiple channels and also transmitting in parallel and independently on the multiple channels. Accordingly, the single association may be called a multi-link association enabled by the multiple physical layers (and multiple lower MAC layers) per upper MAC layer. This distinguishes from those legacy devices that have multiple physical layers and multiple lower MAC layers but only single physical layer and a single lower MAC layer per upper MAC layer. The multi-link capability also enables a plurality of associations between lower MAC layers within a single association between upper MAC layers of wireless devices. The channels may be on different frequency bands distant from one another. The distant may be understood as so separated that it may not feasible to transmit or receive on the channels at the same time without using a dedicated radio front end for each channel. In such embodiments, the STA 100 may support multiple physical layers. In the context of 802.11 systems, one of the channels may include a channel on a 2.4 GHz band while another one of the channels may include a channel on a 5 GHz band. Other systems may employ other frequency bands. However, the channels may be provided on the same frequency band as well. In this case, the STA 100 may have a single physical layer serving multiple lower MAC layers. These embodiments alleviate the channel access in the sense that the STA 100 is not limited by the congestion on one of the channels or bands of the wireless network of the AP 110, e.g. the primary channel. When the channels are on the same frequency band, device implementations may cause some restrictions on capabilities of transmitting simultaneously over multiple links. The devices may have capability of indicating such restrictions to other devices, e.g. via one or more information elements in data frames and/or management frames. In all cases, performance of the STA 100 and the network in general can be improved.

Some embodiments relate to a low-cost AP that supports multiple (lower) MAC layers but a single physical layer. The AP 110 is illustrated in FIG. 1 as such a device. By the virtue of the multiple lower MAC layers 122, 124, the AP 110 may support the multi-link feature, e g channel contention or frame detection on multiple channels independently. However, because of a single radio front end (a single physical layer 126), the AP 110 is able to perform the channel contention or frame detection on a single channel at a time. In other words, the AP 110 may be configured to hop between the channels in the frame detection and/or channel contention during the association with the STA 100, for example.

When associated to the low-cost AP 110, the STA 100 may communicate with the AP 110 as follows. Both devices support the multi-link feature, so the lower MAC layer 122 of the AP 110 may communicate with the lower MAC layer 132 of the STA. Similarly, the lower MAC layer 124 of the AP 110 may communicate with the lower MAC layer 134 of the STA. However, since the AP 110 has only a single physical layer, the lower MAC layers 122, 124 may alternate the use of the physical layer. As a consequence, only one of the lower MAC layers 122, 124 is able to transmit or receive frames at a time.

Such a combination of capabilities of various devices may raise a scenario where the STA 100 performs channel contention on multiple channels (CH #1 and CH #2 in FIG. 1) and, upon successful channel contention on CH #2, transmits a data frame to the AP 110 on CH #2. Since the AP 110 is capable of operating only on one channel at a time, it cannot monitor CH #1 while receiving the data frame on CH #2. Therefore, if the legacy STA 102 performing channel contention only on CH #1 is successful in the channel contention and transmits another data frame to the AP 110 on CH #1 while the STA 100 is transmitting the data frame on CH #2, the AP 110 cannot receive said another data frame on CH #1. As a consequence, said another data frame is lost.

In the scenario of FIG. 1, the stations 100, 102 are associated to the access node 110 while the station 104 is associated to the access node 112. The stations 100, 102 (and 104) and the APs 110, 112 may be within the proximity of one another such that every device is capable of detecting one another's transmissions, when transmitted on same channel. For example, the legacy station 102 may be capable of detecting the transmissions of the APs 110, 112 and the STA 100. The STA 100 may also be capable of detecting the transmissions of at least the APs 110, 112 and the STA 102.

Figure 2:
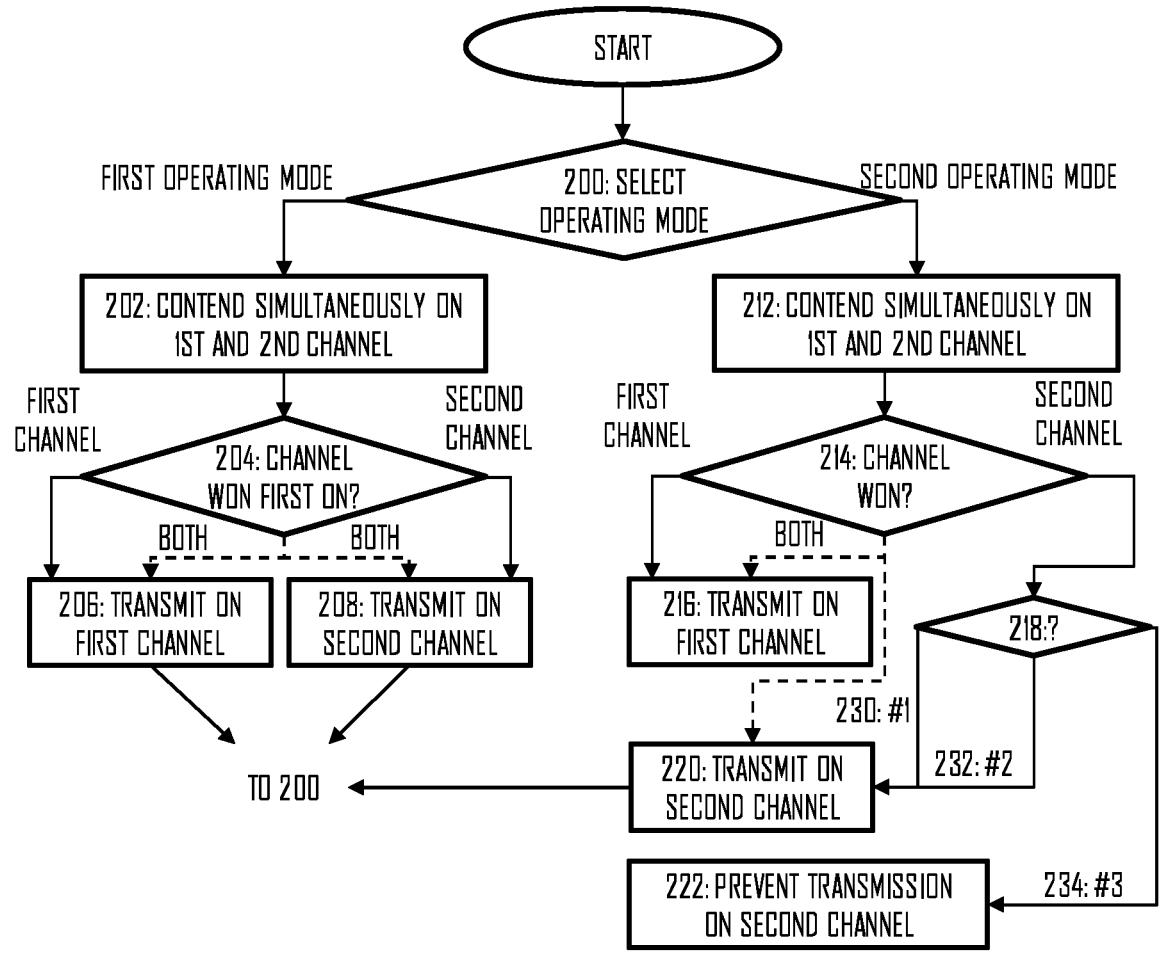
FIG. 2 illustrates an embodiment of a process for performing frame transmissions in a wireless network.

Referring to FIG. 2, let us describe a process for transmitting frames by an apparatus of a first wireless network. The apparatus may be comprised in the STA 100, for example. As described above, the apparatus may support operation on at least a first channel and a second channel of the first wireless network. While operating in a first operating mode (from block 200 to block 202) to transmit a first data frame to a receiver apparatus of the first wireless network, the apparatus contends (block 202) simultaneously on both the first channel and the second channel and transmits the first data frame on the one of the first channel and second channel where said contending is first successful (blocks 204 to 208). Upon switching from the first operating mode to a second operating mode (from block 200 to block 212) and while operating in the second operating mode to transmit a second data frame to the receiver apparatus, the apparatus contends (block 212) simultaneously on both the first channel and the second channel and transmits the second data frame to the receiver apparatus according to certain conditions. One condition may be that, in response to successful contention on the first channel before successful contention on the second channel (from block 214 to block 216), the apparatus transmits the second data frame to the receiver apparatus on the first channel Another condition may be that, in response to successful contention on the second channel before successful contention on the first channel (from block 214 to block 218), the apparatus transmits the second data frame on the second channel (block 220) if the contention is successful also on the first channel (condition #1 in 230) or if the first channel is reserved to an apparatus of a second wireless network different from the first wireless network while the second data frame is transmitted (condition #2 in 232).

In an embodiment, if the contention in block 202 is successful on both channels, both blocks 206 and 208 may be executed, if the apparatus is capable of simultaneous multi-link transmissions. This embodiment is illustrated in FIG. 2 by dashed lines between block 204 and blocks 206, 208. The apparatus may transmit the same data frame on both channels or it may transmit different (data) frames on the first channel than on the second channel, depending on the embodiment.

When the process proceeds from block 204 to block 206 or to block 208, i.e. only one of the two blocks, the channel contention may be successful on the respective channel but not on the other channel. For example, upon winning the contention on the first channel and not on the second channel, the process may proceed from block 204 to block 206 and not block 208. Similarly, upon winning the contention on the second channel and not on the first channel, the process may proceed from block 204 to block 208 and not block 206.

In an embodiment, the apparatus performing the process of FIG. 2 is the STA. The context may be the one illustrated in FIG. 1. In another embodiment, the roles are switched and the access node 110 has multiple physical layers while the STA 100 has only a single physical layer and, as a consequence, capability to serve only one of the lower MAC layers at a time. In such an embodiment, the apparatus performing the process of FIG. 2 may be the access node.

In an embodiment, the apparatus prevents or postpones the transmission of the second data frame on the second channel in the second operating mode (block 222), if the contention is successful on the second channel before the first channel and while the first channel is detected as reserved by another apparatus of the first wireless network (condition #3 in 234).

An advantage of the above-described embodiment is that the apparatus will trigger, in the second operating mode, the transmission of the second data frame upon first ensuring that there is an indication of channel reservation on the first channel and that the channel reservation is either by the apparatus itself (condition #1) or by an apparatus of another wireless network (condition #2). In other words, the apparatus ensures that there is no concurrent transmission by another apparatus of the first wireless network on the first channel while the apparatus transmits the second data frame. In this manner, the apparatus may ensure that the receiver apparatus (e.g. the AP 110) is able to receive the second data frame and that the other devices of the wireless network monitoring only the first channel (e.g. the legacy STA 102) are able to detect that the channel is reserved and they will refrain from channel access on the first channel.

Let us further examine the embodiment of FIG. 2. As described above, the apparatus operates in at least two operational modes, both modes supporting simultaneous contention on multiple channels (blocks 202, 212). Depending on the selected operational mode, the apparatus may follow the left-hand-side branch (the first operational mode) or the right-hand-side branch (the second operational mode) upon triggering a frame transmission procedure. The first operational mode is straightforward in a sense that the frame is transmitted on the channel where the channel contention is first successful. The channel contention on the other channel may then be stopped, and the process may be restarted upon triggering the transmission of the next frame. The first operational mode may be employed when there are no legacy devices associated to the access node (the receiver apparatus) in the wireless network.

The second operational mode may be used when there is at least one legacy device in the wireless network. As described above, upon winning the channel contention in block 214, the process proceeds to block 216 when the channel contention is won on the first channel that is monitored by the legacy device(s). As a consequence, the frame may be transmitted on the first channel in block 216 without further conditions or limitations. However, if the channel contention is successful on the second channel not monitored by the legacy device(s), the apparatus may ensure that the legacy device(s) will not attempt concurrent transmission while the apparatus transmits the (second) data frame. The apparatus performs that check in block 218. If the apparatus itself wins the contention also on the first channel (condition #1 in 230), the apparatus may itself transmit a frame (e.g. the second data frame) on the first channel as well to inform the legacy devices of the channel reservation. Otherwise, if the apparatus detects that the first channel is reserved by an apparatus of an OBSS (condition #2 in 232), the apparatus may trust that the legacy device(s) detect the channel reservation by the apparatus of the OBSS and proceed with the transmission on the second channel in block 220. Otherwise, block 222 may be executed. Regarding condition #3 in 234, if the apparatus detects that the first channel is idle, the apparatus may execute block 222 to proactively prevent a situation that another device of the first wireless network accesses the first channel while the apparatus transmits the second data frame on the second channel, thus preventing a collision in the access node (the receiver apparatus). Further regarding condition #3 in 234, if the apparatus detects that the first channel is reserved by an apparatus of the first wireless network, the apparatus executes block 222 to prevent concurrent transmissions to the same receiver apparatus on multiple channels and associated packet losses.

In an embodiment illustrated by the dashed line arrows, upon winning the channel contention simultaneously on the first channel and the second channel in the second operating mode (blocks 212 and 214), the apparatus may transmit a frame on both channels. (blocks 216 and 220). The apparatus may transmit the same data frame on both channels or different data frames on different channels, depending on the multi-link configuration of the apparatus. The frames may be transmitted to different receiver apparatuses, e.g. to different access nodes, or to the same receiver apparatus.

Figure 3:
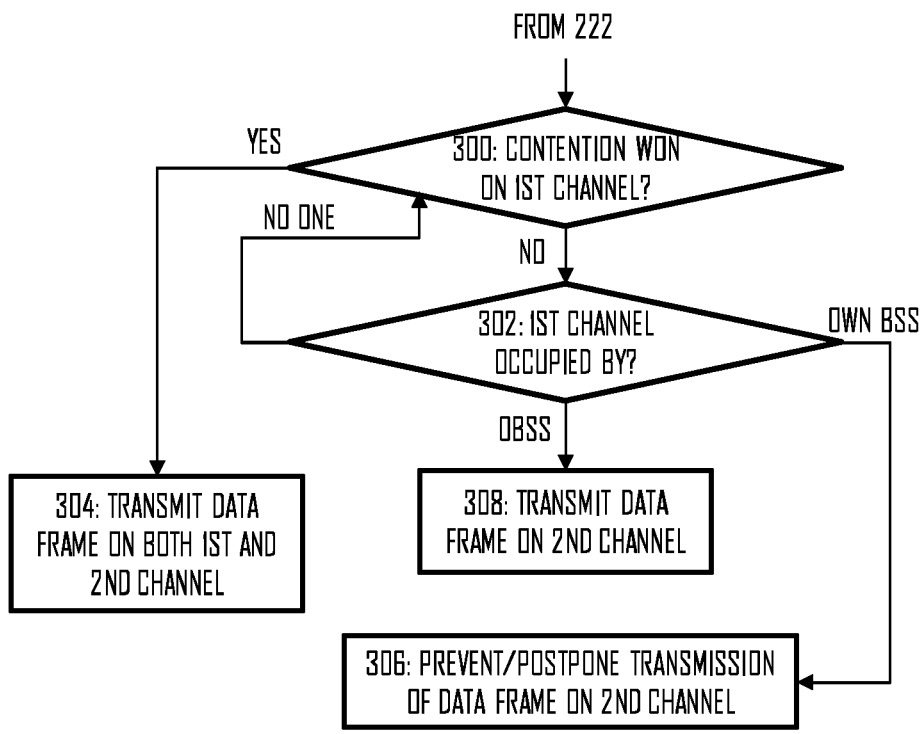
FIG. 3 illustrates an embodiment of a procedure in a second operating mode of a wireless device of the wireless network.

FIG. 3 illustrates an embodiment of the process of FIG. 2, following the principles described above. In other words, the embodiment of FIG. 3 is a description of how the process may proceed upon executing block 222. Referring to FIG. 3, let us describe the operation of the apparatus in the second operating mode in a situation where the channel contention has been successful on the second channel before it has been successful on the first channel Upon winning the channel contention on the second channel, the apparatus may check (block 300) whether the contention has been successful on the first channel. If the contention on the first channel is successful, the process may proceed to block 304 where the apparatus transmits the (second) data frame on the first channel and the second channel. In another embodiment, the apparatus may transmit the (second) data frame on the second channel and another frame on the first channel in block 304. The other frame may be a null data packet, for example, or a management frame. The apparatus may transmit the frame(s) simultaneously or partially simultaneously on the first channel and on the second channel Partially simultaneous transmission may refer to a situation where the two transmissions occur partially but have different start and/or end times. If the contention on the first channel is not successful in block 300, the process may proceed to block 302 where the apparatus determines the current status of the first channel. If the first channel is detected to be free, the process may return to block 300 and resume the channel contention on the first channel. If the first channel is detected to be busy, the apparatus may determine a device that has reserved the first channel. If the device is a device of the first wireless network (own BSS), the process may proceed to block 306 where the transmission of the (second) data frame on the second channel is still prevented or postponed in order to avoid the collision. If the first channel is detected to be reserved by a device of another wireless network (OBSS), the process may proceed to block 308, and the transmission of the (second) data frame may be commenced on the second data channel. In connection with block 308, the apparatus may prevent transmitting any frame on the first channel while transmitting the second data frame on the second channel in block 308.

In an embodiment, the first channel is the above-described primary channel of the first wireless network.

In an embodiment, at least the first channel is operated by the second wireless network, and it may be the primary channel of the second wireless network. In an embodiment, the first channel is the primary channel of the first wireless network and the second wireless network. In an embodiment, the second channel is a secondary channel of the first wireless network and, in some embodiments, a secondary channel of the second wireless network.

In an embodiment, the first channel and the second channel are frequency channels. The frequency channels may each have a bandwidth of 20 MHz according to 802.11 specifications. In other embodiments, the bandwidth may be 1 MHz, 5 MHz, and/or 10 MHz In an embodiment, the above-described receiver apparatus is an access node of the first wireless network.

In an embodiment, the apparatus performs the channel contention on the first channel and the second channel by using the above-described physical carrier sensing function and/or a virtual carrier sensing function to determine whether the first channel and the second channel, respectively, is busy or idle. As described above, in the physical carrier sensing the apparatus senses the channel and, upon detecting radio energy above a determined threshold, the channel is sensed to be busy. Otherwise, the channel is sensed to be idle. In the virtual carrier sensing, the NAV is set for a determined duration on a channel and the channel is considered to be busy for that duration. Thereafter, the channel is considered to be free, unless the physical carrier sensing indicates otherwise.

As described above in connection with FIG. 2 and block 200, the apparatus may switch between the first operating mode and the second operating mode. Let us then describe the switching with reference to FIGS. 4 and 5.

Figure 4:
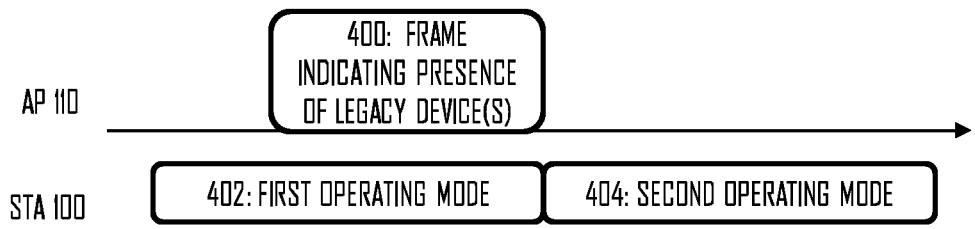
FIGS. 4 and 5 illustrates embodiments for switching between two operating modes by the wireless device.

FIG. 4 illustrates an embodiment where the switch from the first operating mode to the second operating mode is performed by the apparatus (the STA 100) in response to a message received from the receiver apparatus (the AP 110), the message indicating said switch to the second operating mode. Referring to FIG. 4, the apparatus may at first operate in the first operating mode 402. Upon receiving the message 400, the apparatus may switch to the second operating mode 404. In an embodiment, the message comprises at least one information element indicating whether or not the second operating mode is enabled. Let us next describe a few embodiments of the at least one information element.

The at least one information element may be comprised in a management frame such as a beacon frame, and/or the at least one information element may be comprised in an action frame addressed to the apparatus or multiple apparatuses in a unicast or multicast manner.

The at least one information element may comprise, in addition to an information element indicating enablement of the second operating mode, additional related parameters, such as an RSSI (received signal strength indicator) threshold or MAC address(es) of the legacy device(s). The apparatus may use the MAC address(es) to, for example, track power-save modes of the legacy devices. Accordingly, the apparatus may enable the first operating mode when the legacy devices are all in the power-save mode and enable the second operating mode when there is at least one legacy device in an active mode. The RSSI threshold may be used by the apparatus to determine, for each legacy device, whether or not the frame transmission on the first channel will prevent the collision. For example, if the RSSI threshold of a legacy device is set so low that the legacy device will initiate transmission even upon detecting the frame transmission by the apparatus on the first channel Upon detecting such a low RSSI threshold for all legacy devices, the apparatus may stay in the first operating mode even in a case where there are legacy devices. If the RSSI threshold is on such a level that the frame transmission on the first channel by the apparatus prevents the colliding transmission by the legacy device(s), the apparatus may select the second operating mode. The apparatus may base the selection on measuring (an RSSI of) a signal received from the legacy device and comparing the RSSI threshold with the measured RSSI.

Figure 5:
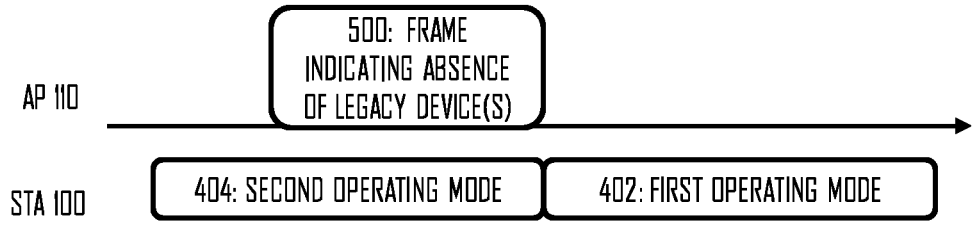

FIG. 5 illustrates an embodiment where the apparatus switches from the second operating mode to the first operating mode in response to receiving, from the receiver apparatus, a message indicating to switch to the first operating mode. The message may be similar to that of the embodiments described above in connection with FIG. 4, but the value of the information element may be different.

In yet another embodiment, the apparatus may switch between the first operating mode and second operating mode on the basis of observations on the legacy devices made on its own. For example, upon detecting a frame transmission by a legacy device, the apparatus may enter the second operating mode. Upon detecting no frame transmissions from legacy devices for a determined time interval, the apparatus may switch from the second operating mode to the first operating mode.

Figure 6:
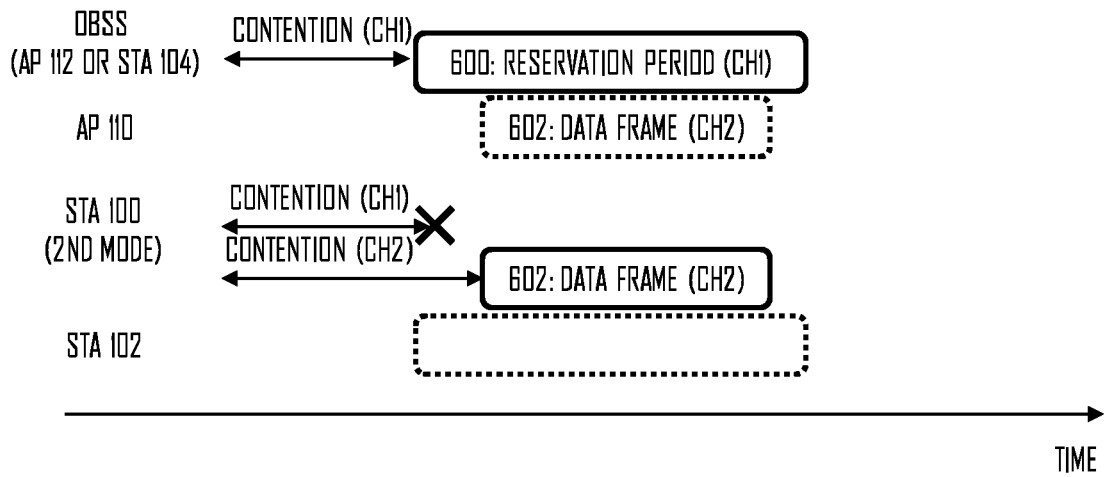
FIG. 6 illustrates a procedure for employing concurrent transmissions to realize coexistence with legacy devices according to an embodiment.

Let us then examine the situation related to block 308 in greater detail with reference to FIG. 6. In the second operating mode, in response to the successful contention on the second channel before the first channel, and in response to detecting that the first channel is reserved by a device of an OBSS for a reservation period, the apparatus transmits the (second) data frame on the second channel such that the transmission starts and ends during the reservation period. The reservation period may be indicated by a duration field in a frame transmitted by the device of the OBSS on the first channel, and detection of the reservation period may trigger the NAV in the apparatus with respect to the first channel. Accordingly, the reservation period may be based on the NAV according to IEEE 802.11 specifications.

Referring to FIG. 6, the apparatus (STA 100 operating in the second operating mode) performs the channel contention on the first channel (CH1) and second channel (CH2). The contention on the first channel is interrupted by the OBSS (STA 104 or AP 112) winning the channel contention on the first channel and transmitting a frame 600 triggering the reservation period. The detection of the frame 600 by the STA 104 prevents the channel access on the first channel by the legacy device (STA 102). This is illustrated by the dotted box related to the STA 102 on the timeline of FIG. 6. Similarly, it prevents the channel access on the first channel by the apparatus. Thereafter, upon successful channel contention on the second channel, the apparatus transmits the data frame 602 to the receiver apparatus (the AP 110) on the second channel, and the data frame is received by the receiver apparatus, as illustrated by the dotted box related to the AP 110 on the timeline of FIG. 6.

As illustrated, the data frame 602 is transmitted within the reservation period 600. The apparatus may ensure that the (second) data frame can be transmitted the second channel during the reservation period before performing the transmission. For that purpose, block 308 of FIG. 3 may comprise checking, upon successful channel contention on the second channel, whether or not the remaining duration of the reservation period is sufficiently long so that the second data frame can be transmitted within the reservation period. If the remaining duration of the reservation period is sufficiently long, the apparatus may proceed with the transmission on the second channel. If the remaining duration of the reservation period is not long enough, the apparatus may prevent the transmission on the second channel, and the process may return to block 212.

Figure 7:
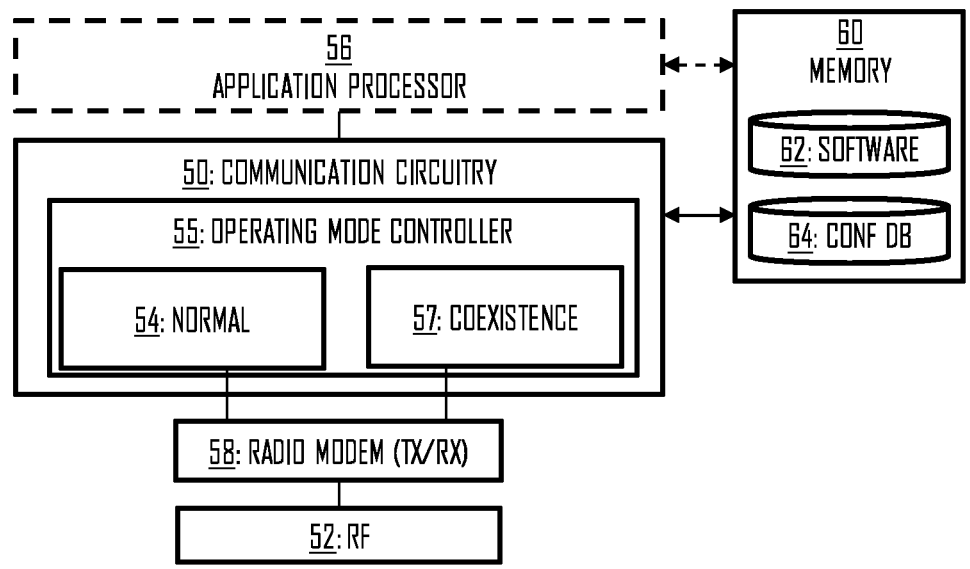
FIG. 7 illustrates a block diagram of a structure of an apparatus according to an embodiment of the invention.

FIG. 7 illustrates an embodiment of a structure of the above-mentioned functionalities of an apparatus executing the functions of the apparatus in the process of FIG. 2 or any one of the embodiments of FIG. 2 described above. The apparatus may be a wireless device such as the STA 100, or it may be an access node, e.g. another access node in the same wireless network as the AP 110. The apparatus may comply with 802.11 specifications. The apparatus may be or may be comprised in a computer (PC), a laptop, a tablet computer, a cellular phone, a palm computer, a sensor device, a router device, or any other apparatus provided with radio communication capability. In another embodiment, the apparatus carrying out the process of FIG. 2 or any one of its embodiments is comprised in such a wireless device, e.g. the apparatus may comprise a circuitry, e.g. a chip, a chipset, a processor, a micro controller, or a combination of such circuitries in the wireless device. The apparatus may be an electronic device comprising electronic circuitries for realizing some embodiments of the wireless device.

Referring to FIG. 7, the apparatus may comprise a communication circuitry 50 providing the apparatus with capability of communicating in at least the above-described first wireless network. The communication circuitry may employ a radio interface providing the apparatus with radio communication capability. The radio interface may comprise a radio modem 58 and radio frequency (RF) circuitries 52 providing at least a part of the above-described physical layer(s) of the wireless device. The radio interface may be comprised in the apparatus in the embodiments where the apparatus is the wireless device. In other embodiments where the apparatus is a chipset for the wireless device, the radio interface may be external to the apparatus. The radio interface may support frame transmission and reception according to the principles described above. The RF circuitries 52 may comprise radio frequency converters and components such as an amplifier, filter, and one or more antennas. The radio modem 58 may comprise baseband signal processing circuitries such as (de)modulator and encoder/decoder circuitries. The communication circuitry may carry out at least some of the functions of the MAC layer(s) described above. In embodiments where the apparatus employs multiple physical layer entities, the radio modem 58 and the RF circuitries 52 may employ a separate transmitter and receiver branch for each of the multiple links supported by the apparatus. The radio modem 58 and the RF circuitries 52 may include a dedicated circuitry for the physical layer 136 and another dedicated circuitry for the physical layer 138, although the dedicated circuitries may employ partially the same physical components in the transmission and/or reception.

The communication circuitry may comprise an operating mode controller 55 configured to carry out block 200. In other words, the operating mode controller 55 may select the first operating mode (a normal mode or a default mode) and enable a corresponding module 54 in the apparatus, or it may select the second operating mode (a coexistence mode) and enable a corresponding module 57 in the apparatus. The module 54 operating frame transmissions in the first operating mode may be configured to carry out blocks 202 to 208 in the above-described manner. The module 57 operating frame transmissions in the second operating mode may be configured to carry out blocks 212 to 222 in the above-described manner.

In embodiments where the apparatus is the STA 100 or a similar client device or terminal device, the apparatus may further comprise an application processor 56 executing one or more computer program applications that generate a need to transmit and/or receive data through the communication circuitry 50. The application processor may form an application layer of the apparatus. The application processor may execute computer programs forming the primary function of the apparatus. For example, if the apparatus is a sensor device, the application processor may execute one or more signal processing applications processing measurement data acquired from one or more sensor heads. If the apparatus is a computer system of a vehicle, the application processor may execute a media application and/or an autonomous driving and navigation application. The application processor may generate data to be transmitted in the wireless network.

The apparatus may further comprise a memory 60 storing one or more computer program products 62 configuring the operation of said processor(s) of the apparatus. The memory 60 may further store a configuration database 64 storing operational configurations of the apparatus. The configuration database 64 may store, for example, any one of the above-described parameters for indicating or determining the presence of legacy devices and/or the frame transmission rules for each operating mode described above.

As used in this application, the term 'circuitry' refers to one or more of the following: (a) hardware-only circuit implementations such as implementations in only analog and/or digital circuitry; (b) combinations of circuits and software and/or firmware, such as (as applicable): (i) a combination of processor(s) or processor cores; or (ii) portions of processor(s)/software including digital signal processor(s), software, and at least one memory that work together to cause an apparatus to perform specific functions; and (c) circuits, such as a microprocessor(s) or a portion of a microprocessor(s), that require software or firmware for operation, even if the software or firmware is not physically present.

This definition of 'circuitry' applies to uses of this term in this application. As a further example, as used in this application, the term "circuitry" would also cover an implementation of merely a processor (or multiple processors) or portion of a processor, e.g. one core of a multi-core processor, and its (or their) accompanying software and/or firmware. The term "circuitry" would also cover, for example and if applicable to the particular element, a baseband integrated circuit, an application-specific integrated circuit (ASIC), and/or a field-programmable grid array (FPGA) circuit for the apparatus according to an embodiment of the invention.

The processes or methods described in FIGS. 2 to 6 may also be carried out in the form of one or more computer processes defined by one or more computer programs. A separate computer program may be provided in one or more apparatuses that execute functions of the processes described in connection with the Figures. The computer program(s) may be in source code form, object code form, or in some intermediate form, and it may be stored in some sort of carrier, which may be any entity or device capable of carrying the program. Such carriers include transitory and/or non-transitory computer media, e.g. a record medium, computer memory, read-only memory, electrical carrier signal, telecommunications signal, and software distribution package. Depending on the processing power needed, the computer program may be executed in a single electronic digital processing unit or it may be distributed amongst a number of processing units.

Embodiments described herein are applicable to wireless networks defined above but also to other wireless networks. The protocols used, the specifications of the wireless networks and their network elements develop rapidly. Such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. Embodiments are not limited to the examples described above but may vary within the scope of the claims.

The invention claimed is:

1. An apparatus comprising:
at least one processor; and
at least one memory including computer program code, the at least one memory and computer program code configured to, with the at least one processor, cause the apparatus at least to:
operate, on at least a first channel and a second channel of a first wireless network;
while performing said operating in a first operating mode to transmit a first data frame to a receiver apparatus of the first wireless network, contend simultaneously on both the first channel and the second channel and transmit the first data frame on the one of the first channel and second channel where said contending is first successful;
switch from the first operating mode to a second operating mode;
while operating in the second operating mode to transmit a second data frame to the receiver apparatus, contend simultaneously on both the first channel and the second channel and transmit the second data frame to the receiver apparatus according to the following conditions:
in response to successful contention on the first channel before successful contention on the second channel, transmit the second data frame to the receiver apparatus on the first channel; and
in response to successful contention on the second channel before successful contention on the first channel, transmit the second data frame on the second channel if the contention becomes successful also on the first channel or if the first channel is reserved to an apparatus of a second wireless network different from the first wireless network while the second data frame is transmitted.

2. The apparatus of claim 1, further configured to send, in the second operating mode, a frame on the first channel while transmitting the second frame on the second channel in a case where the contention is successful on the second channel before the first channel and the channel contention is successful also on the first channel.

3. The apparatus of claim 1, further configured to prevent or postpone the transmission of the second data frame on the second channel in the second operating mode, if the contention is successful on the second channel before the first channel and while the first channel is detected as reserved by another apparatus of the first wireless network.

4. The apparatus of claim 3, further configured in the second operating mode to postpone, if the contention is first successful on the second channel and if the first channel is detected as reserved by said another apparatus of the first wireless network, the transmission of the second data frame on the second channel until the contention is successful also on the first channel.

5. The apparatus of claim 1, further configured in the second operating mode to transmit the second data frame, in response to said successful contention on the second channel before the first channel and in response to said detecting that the first channel is reserved to said apparatus of the second wireless network for a reservation period, such that the transmission of the second data frame starts and ends during the reservation period.

6. The apparatus of claim 1, further configured to transmit, while operating in the second operating mode and in response to successful channel contention on both the first channel and the second channel, the second data frame on the first channel.

7. The apparatus of claim 1, wherein the first channel is a primary channel of a basic service set, and the receiver apparatus is an access node of the first wireless network.

8. The apparatus of claim 1, further configured to switch from the first operating mode to the second operating mode in response to a message received from the receiver apparatus, the message being indicative of said switch to the second operating mode.

9. The apparatus of claim 1, further configured to switch from the second operating mode to the first operating mode in response to receiving, from the receiver apparatus, a message indicating to switch to the first operating mode.

10. The apparatus of claim 8, wherein the message is a beacon frame or an action frame.

11. The apparatus of claim 9, wherein the message is a beacon frame or an action frame.

12. The apparatus of claim 1, further configured to transmit, in response to successful contention on the second channel simultaneously with successful contention on the first channel, the second data frame on the second channel and a frame on the first channel.

13. The apparatus of claim 1, further configured to perform the channel contention on the first channel and the second channel by using a physical carrier sensing function to determine whether the first channel and the second channel, respectively, is busy or idle.

14. The apparatus of claim 1, further configured to prevent transmitting any frame on the first channel while transmitting the second data frame on the second channel.

15. The apparatus of claim 1, wherein the reservation period is based on a network allocation vector according to IEEE 802.11 specifications.

16. A method, comprising:
operating, by an apparatus on at least a first channel and a second channel of a first wireless network;
while performing said operating in a first operating mode to transmit a first data frame to a receiver apparatus of the first wireless network, contending by the apparatus simultaneously on both the first channel and the second channel and transmitting the first data frame on the one of the first channel and second channel where said contending is first successful;
switching, by the apparatus, from the first operating mode to a second operating mode;
while operating, by the apparatus, in the second operating mode to transmit a second data frame to the receiver apparatus, contending simultaneously on both the first channel and the second channel and transmitting the second data frame to the receiver apparatus according to the following conditions:
in response to successful contention on the first channel before successful contention on the second channel, transmitting the second data frame to the receiver apparatus on the first channel; and
in response to successful contention on the second channel before successful contention on the first channel, transmitting the second data frame on the second channel if the contention becomes successful also on the first channel or if the first channel is reserved to an apparatus of a second wireless network different from the first wireless network while the second data frame is transmitted.

17. The method of claim 15, wherein the apparatus transmits, in the second operating mode, a frame on the first channel while transmitting the second frame on the second channel in a case where the contention is successful on the second channel before the first channel and the channel contention is successful also on the first channel.

18. The method of claim 15, wherein the apparatus prevents or postpones the transmission of the second data frame on the second channel in the second operating mode, if the contention is successful on the second channel before the first channel and while the first channel is detected as reserved by another apparatus of the first wireless network.

19. The method of claim 17, wherein the apparatus in the second operating mode postpones, if the contention is first successful on the second channel and if the first channel is detected as reserved by said another apparatus of the first wireless network, the transmission of the second data frame on the second channel until the contention is successful also on the first channel.

20. A computer program product embodied on a computer-readable medium and comprising a computer program code readable by a computer for an apparatus, wherein the computer program code configures the computer to carry out a computer process that causes the apparatus to at least perform the following:
operating on at least a first channel and a second channel of a first wireless network;
while performing said operating in a first operating mode to transmit a first data frame to a receiver apparatus of the first wireless network, contending simultaneously on both the first channel and the second channel and transmitting the first data frame on the one of the first channel and second channel where said contending is first successful;
switching from the first operating mode to a second operating mode;
while operating in the second operating mode to transmit a second data frame to the receiver apparatus, contending simultaneously on both the first channel and the second channel and transmitting the second data frame to the receiver apparatus according to the following conditions:
in response to successful contention on the first channel before successful contention on the second channel, transmitting the second data frame to the receiver apparatus on the first channel; and
in response to successful contention on the second channel before successful contention on the first channel, transmitting the second data frame on the second channel if the contention becomes successful also on the first channel or if the first channel is reserved to an apparatus of a second wireless network different from the first wireless network while the second data frame is transmitted.

* * * * *